(12) United States Patent
Sileo et al.

(10) Patent No.: US 6,912,838 B2
(45) Date of Patent: Jul. 5, 2005

(54) COATED CROSSFIRE TUBE ASSEMBLY

(75) Inventors: Gerry A. Sileo, Palm Beach Gardens, FL (US); Terry L. Hollis, Wellington, FL (US)

(73) Assignee: Power Systems MFG, LLC, Jupiter, FL (US)

(*) Notice: Subject to any disclaimer, the term of this patent is extended or adjusted under 35 U.S.C. 154(b) by 152 days.

(21) Appl. No.: 10/382,410

(22) Filed: Mar. 6, 2003

(65) Prior Publication Data

US 2004/0172952 A1 Sep. 9, 2004

(51) Int. Cl.[7] .................................................. F02C 3/14
(52) U.S. Cl. ........................................ 60/39.37; 60/799
(58) Field of Search ................................ 60/796, 39.37, 60/799

(56) References Cited

U.S. PATENT DOCUMENTS

| | | | |
|---|---|---|---|
| 4,249,372 A | 2/1981 | White | |
| 5,001,896 A | 3/1991 | Hilt et al. | |
| 5,154,049 A | 10/1992 | Ford et al. | |
| 5,219,256 A | 6/1993 | Ford et al. | |
| 5,361,577 A | 11/1994 | Cromer | |
| 5,749,218 A | * 5/1998 | Cromer et al. | ................ 60/796 |
| 5,896,742 A | 4/1999 | Black et al. | |
| 6,220,015 B1 | 4/2001 | Mina | |
| 6,334,294 B1 | 1/2002 | Belsom et al. | |

* cited by examiner

Primary Examiner—Ehud Gartenberg
(74) Attorney, Agent, or Firm—Brian R. Mack

(57) ABSTRACT

A crossfire tube assembly is provided having an increased resistance to wear and oxidation. This increased resistance is provided by the application of coatings to the mating surfaces between the crossfire tube and crossfire tube clip. In the preferred embodiment, a physical vapor deposition (PVD) Titanium Aluminum Nitride coating is applied to the outer walls of the crossfire tubes which is used in combination with an air plasma spray (APS) Aluminum Bronze coating applied to the crossfire tube clip open end that mates with the crossfire tubes. The coating combination serves to protect the components from frictional wear and extend their life. In an alternate embodiment, the crossfire tubes also contain a plurality of air purge holes that provide a layer of cooling air along the crossfire tube inner wall.

16 Claims, 5 Drawing Sheets

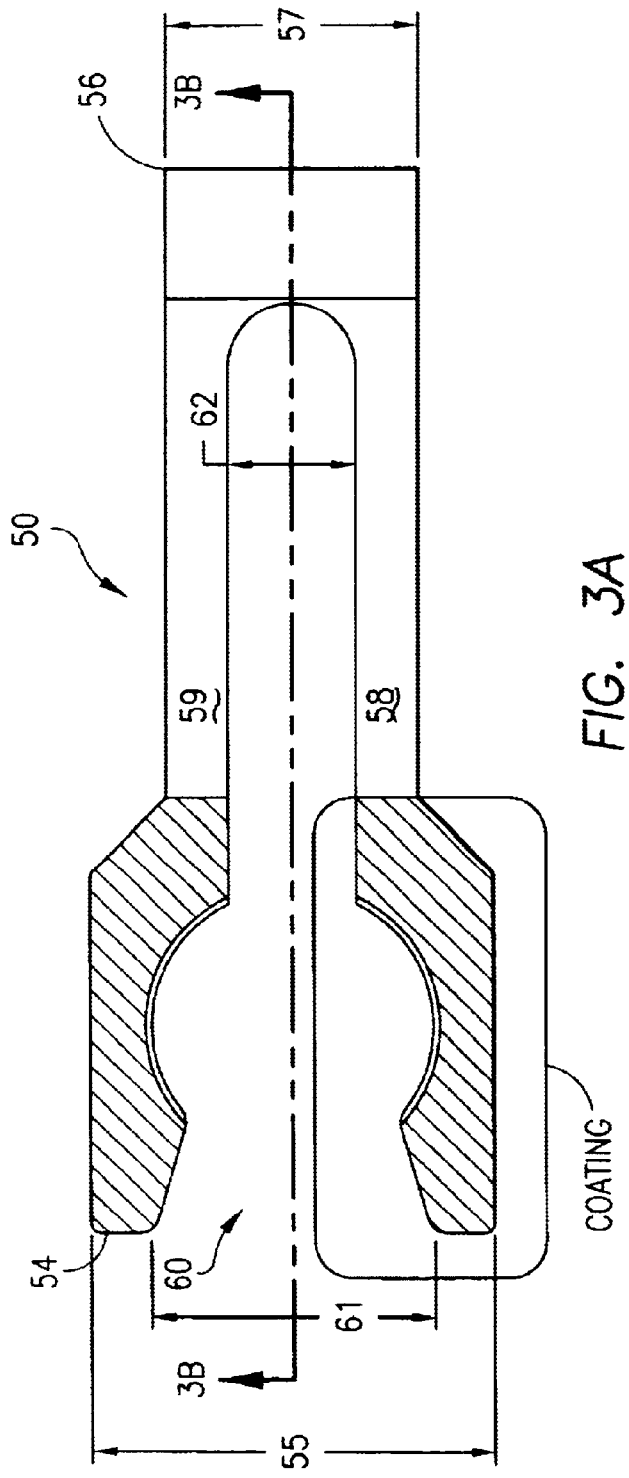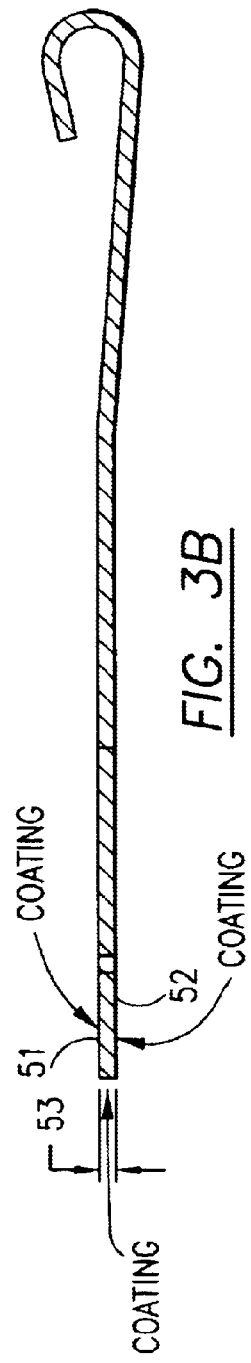
FIG. 3A
FIG. 3B

COATED CROSSFIRE TUBE ASSEMBLY

BACKGROUND OF THE INVENTION

1. Field of the Invention

This invention relates to gas turbine combustors and more specifically to combustion systems that are interconnected by crossfire tube assemblies for ignition purposes.

2. Description of Related Art

In a typical industrial gas turbine engine, a plurality of combustors are arranged in a generally annular array about the engine. Each combustor receives pressurized air from the engine compressor and has a means of fuel injection. Given an ignition source, the proper temperature levels of both the fuel and air, as well as sufficient mixing of the fluids, combustion will occur. The resulting hot gases leave the combustors and enter a turbine, which drives a generator to generate electricity. Due to the cost and control complexity of ignition systems, typically only one or two combustors have an ignition source. Therefore, in order to initiate combustion in all combustors, it has become standard practice to interconnect the combustors with crossfire tube assemblies. Crossfire tubes are configured to transfer a flame between adjacent combustors during the initial start-up period. Although a crossfire tube assembly is advantageous by eliminating additional ignition sources, it has operational issues including cooling, excessive wear, and oxidation, each of which can lead to premature replacement.

A crossfire tube of the prior art is shown in FIG. 1. In this embodiment, a hollow inner tube 10 is telescopically received within a hollow outer tube 11. The ends of the telescope-like assembly 12 and 13 are received within adjacent combustors 14 and 15 and the assembly serves to transfer a flame between combustors 14 and 15. Inner tube 10 is clipped to plate 21 at groove 19 while outer tube 11 is clipped to plate 20 at groove 18. While inner tube 10 and outer tube 11 serve to adequately transfer a flame between combustors 14 and 15, ends 12 and 13 have been known to experience significant wear due to frictional rub contact with cross fire receptacles 16 and 17. Furthermore, wear has been known to occur in crossfire clip grooves 18 and 19 due to rubbing between the crossfire tube clip and inner tube 10 and outer tube 11. Crossfire tubes of the prior art are typically manufactured from relatively soft material, typically a stainless steel, while crossfire tube clips are often manufactured from a harder material. While some wear is expected to the crossfire tubes, since they are subject to some movement, engine vibrations, and are considered consumable items, it is desirable to further extend their life to reduce operating costs associated with premature replacement.

SUMMARY AND OBJECTS OF THE INVENTION

The present invention seeks to overcome the shortfalls of the prior art by providing a telescoping crossfire tube assembly that has increased resistance to wear and oxidation. This increased resistance is provided by an application of coatings to the mating surfaces of the crossfire tube and crossfire tube clip. In the preferred embodiment, a Titanium Aluminum Nitride first coating is applied to the outer walls of the crossfire tubes by physical vapor deposition (PVD) and an Aluminum Bronze second coating, applied by an air plasma spray (APS) process, is applied to the crossfire tube clip open end that mates with the crossfire tubes. By using a PVD process for coating the crossfire tubes, the coating can be applied less than 0.001 inches thick and has a smooth surface finish, thereby eliminating the need to machine the parts after coating to bring them within the manufacturing tolerances. This allows for one design of crossfire tubes to serve as both coated and uncoated options, should the engine operator decide coating is not desired. Furthermore, applying the preferred Titanium Aluminum Nitride coating via the PVD process increases the coating hardness since the coating has a more homogeneous microstructure than current state of the art coatings. Prior art coatings typically have microstructures that are formed of essentially hard carbides in a ductile matrix and must be finish machined after coating in order to prevent aggressive wear to the mating surface. Although Titanium Aluminum Nitride is the preferred coating, alternate coatings including Titanium Nitride, Aluminum Titanium Nitride, Stellite 31, Stellite 694, Triballoy T-400, and Tiballoy T-800 can be used as well. An alternate embodiment of the present invention is also disclosed which incorporates air purge holes to supply a layer of cooling air to the internal walls of the crossfire tubes, which is used in addition to the coatings of the preferred embodiment.

It is an object of the present invention to provide a crossfire tube assembly having increased resistance to wear and oxidation.

It is a further object of the present invention to provide a coating process for cross fire tubes that does not require machining after coating and results in increased coating hardness.

In accordance with these and other objects, which will become apparent hereinafter, the instant invention will now be described with particular reference to the accompanying drawings.

BRIEF DESCRIPTION OF DRAWINGS

FIG. 3A is a top view of a crossfire tube clip for use in a crossfire tube assembly in accordance with the preferred embodiment of the present invention.

FIG. 3B is a cross section view of a crossfire tube clip for use in a crossfire tube assembly in accordance with the preferred embodiment of the present invention.

DETAILED DESCRIPTION OF THE PREFERRED EMBODIMENT

Figure 1:
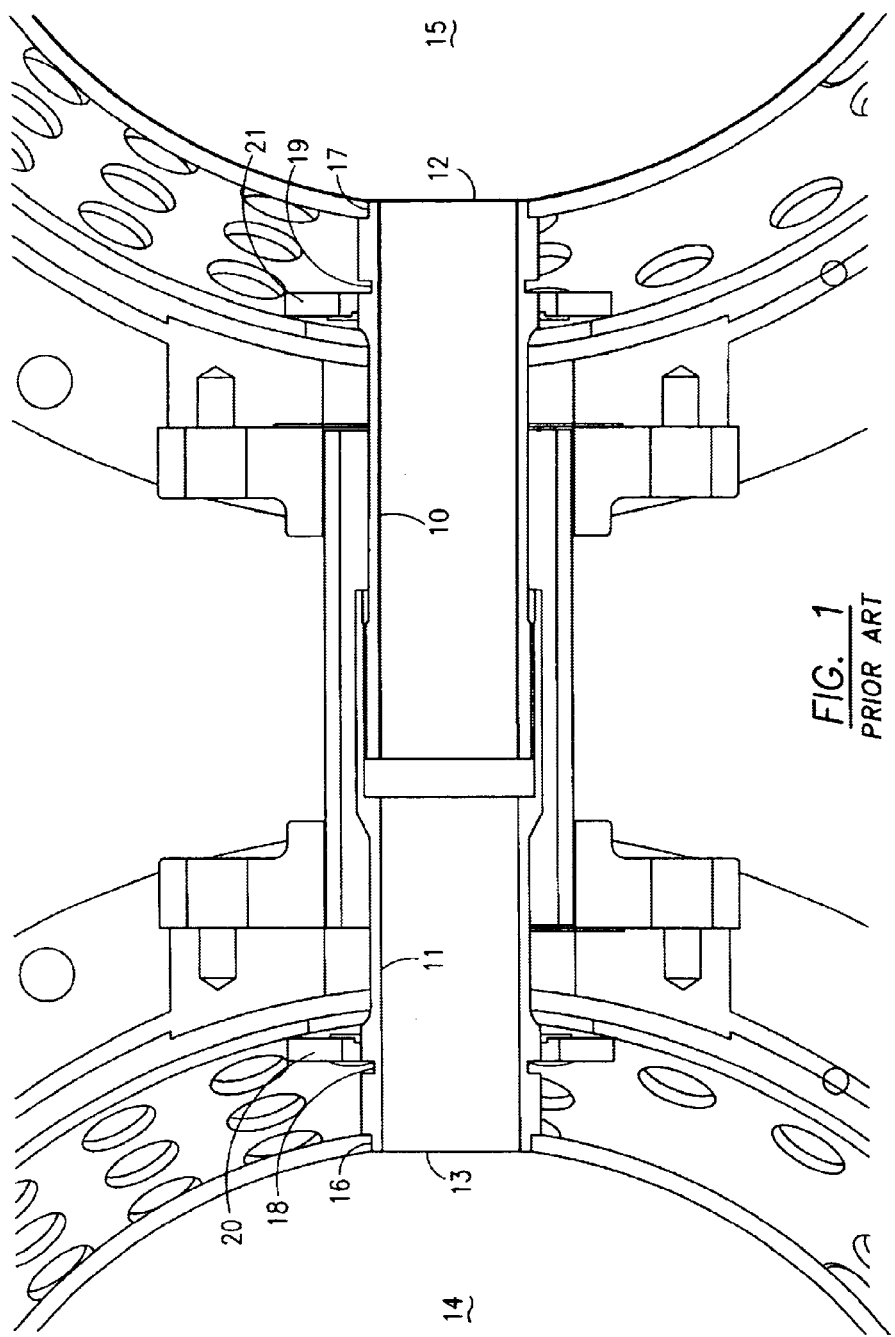
FIG. 1 is a cross section view of a crossfire tube assembly of the prior art interconnecting adjacent combustors.
Figure 2:
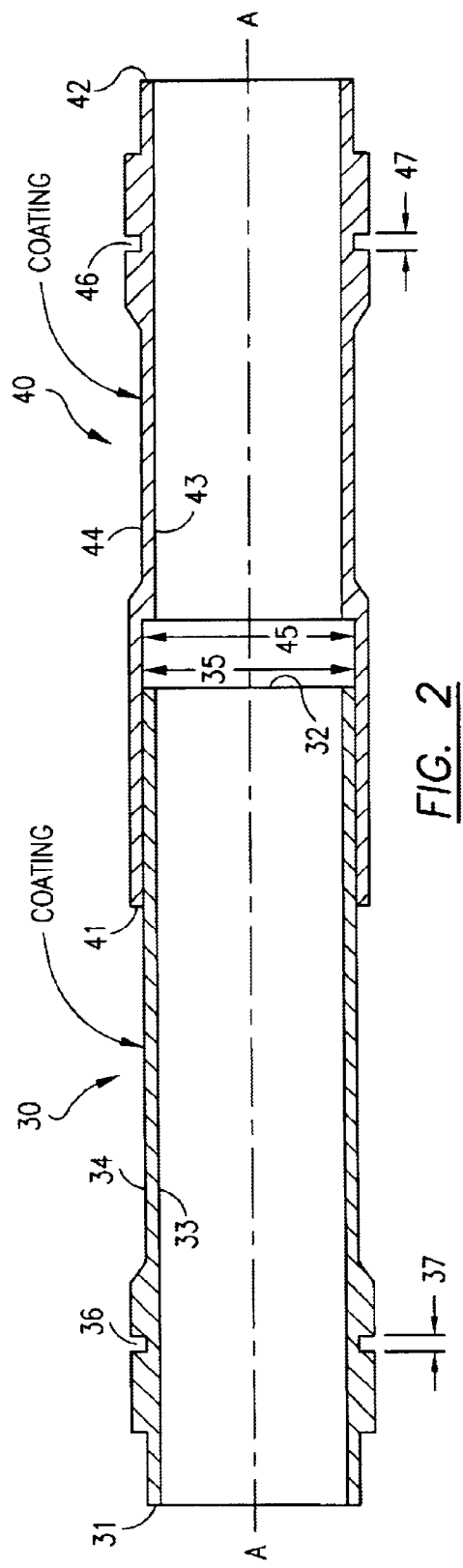
FIG. 2 is a cross section view of inner and outer tubes of a crossfire tube assembly in accordance with the preferred embodiment of the present invention.
Figure 4:
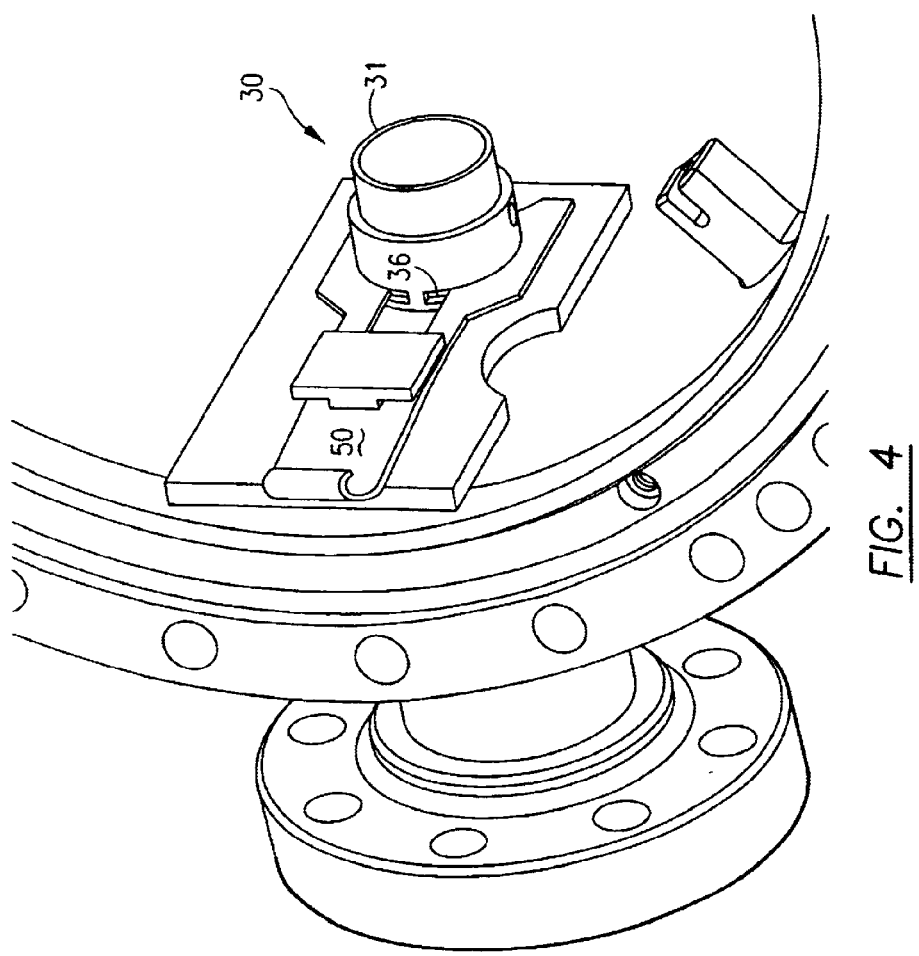
FIG. 4 is a partial perspective view of a combustor incorporating a crossfire tube assembly in accordance with the preferred embodiment of the present invention.

The preferred embodiment of the present invention, a crossfire tube assembly for connecting adjacent combustors in a gas turbine engine, is shown in detail in FIGS. 2–4. Referring now to FIG. 2, a hollow inner tube 30 is shown having a first axis A-A, a first inner end 31, a second inner end 32, a first inner wall 33, and a first outer wall 34 coaxial with and radially outward of first inner wall 33. First outer wall 34 also has a first diameter 35 proximate second inner end 32 and a first groove 36 having a first groove width 37 which is circumferentially disposed about first outer wall 34 proximate first inner end 31. The crossfire tube assembly also contains a hollow outer tube 40 that is coaxial with hollow inner tube 30 and has a first outer end 41, a second outer end 42, a second inner wall 43, and a second outer wall 44 that is coaxial with and radially outward from second inner wall 43. Second inner wall 43 has a second diameter 45 proximate said first outer end, which is slightly larger than first diameter 35, such that a portion of hollow inner tube 30 is telescopically received within hollow outer tube 40. This is accomplished by second inner end 32 being located radially inward of second inner wall 43 proximate first outer end 41. Second outer wall 44 also contains a second groove 46 having a second groove width 47 which is circumferentially disposed about second outer wall 44 proximate second outer end 42.

A first coating is applied to first outer wall 34 of hollow inner tube 30 and second outer wall 44 of hollow outer tube 40, including first and second grooves, 36 and 46, respectively. The first coating, which is preferably applied by a physical vapor deposition (PVD) process, where the coating is formed in-situ in a coating chamber through the introduction of an additional gas, Nitrogen or Argon, depending on the selected first coating. More specifically, Nitrogen gas is added to the chamber if the first coating is Titanium Aluminum Nitride, Aluminum Titanium Nitride, or Titanium Nitride. Alternatively, a non-reactive gas is added to the coating process if Stellite 31, Stellite 694. Triballoy T-400, or Triballoy T-800 is selected as the first coating. Due to the improved hardness achieved through this group of coating materials and the PVD application process, the first coating need only be applied less than 0.001 inches thick, preferably between 0.00004 inches and 0.00012 inches thick.

Referring now to FIGS. 3A and 3B, the crossfire tube assembly of the present invention also includes a plurality of clips 50. Each clip 50 has a first surface 51, a second surface 52, a thickness 53 there between, a first clip end 54 having a first width 55, and a second clip end 56 having a second width 57. Extending from first clip end 54 to proximate second clip end 56 is a first leg 58 and a second leg 59 with first leg 58 and second leg 59 separated by an opening 60 having a third width 61 at first clip end 54 and a fourth width 62 proximate second clip end 56. In the preferred embodiment of the present invention, first width 55 is greater than second width 57 and third width 61 is greater than fourth width 62.

A second coating is applied to crossfire tube clip first surface 51, second surface 52, and across thickness 53 between first leg 58 and second leg 59, extending from first end 54 at least along a region of clip 50 having a first width 55. The second coating, which is preferably applied by an air plasma spray (APS) process, where coating particles are injected into a plasma jet of a spray gun, where they melt and then strike the surface to be coated at a high velocity to produce a strongly adherent coating. In the preferred embodiment, the second coating has an Aluminum Bronze based composition consisting essentially of copper with lesser amounts of aluminum and iron. The second coating can also be applied by the previously mentioned physical vapor deposition (PVD) process or by a High Velocity Oxygen Fuel (HVOF) process, where a hot, high pressure gas stream heats and accelerates the coating material such that impacts the surface to be coated with tremendous energy while having a short dwell time which reduces oxidation and decomposition. The second coating, for the preferred embodiment, is applied between 0.003 inches and 0.006 inches thick.

Referring now to FIG. 4, inner and outer hollow tubes and clips are assembled to form a crossfire tube assembly when clips 50 engage first groove 36 of hollow inner tube 30 and second grove 46 of hollow outer tube 40 by opening 60 passing around first groove 36 and second groove 46 such that clip 50 is locked around hollow inner tube 30 and hollow outer tube 40. Clips 50 are used to ensure that hollow inner tube 30 and hollow outer tube 40 do not become disengaged from their respective combustors. Due to assembly tolerances and relative thermal expansions between the combustor and crossfire tube assembly, it is necessary to allow some movement between hollow inner tube 30, hollow outer tube 40, and their respective clips 50. To compensate for this necessary movement and adjustability, thickness 53 of clip 50 is equal to at least 75% of first groove width 37 and second groove width 47. In the preferred embodiment, the combination of the Titanium Aluminum Nitride first coating on the relatively soft hollow inner and outer tubes and Aluminum Bronze second coating on the crossfire tube clips results in a favorable wear reduction system since the amount of operational time required to achieve similar amounts of wear on a coated assembly as seen on an uncoated crossfire tube assembly is significantly increased.

Figure 5:
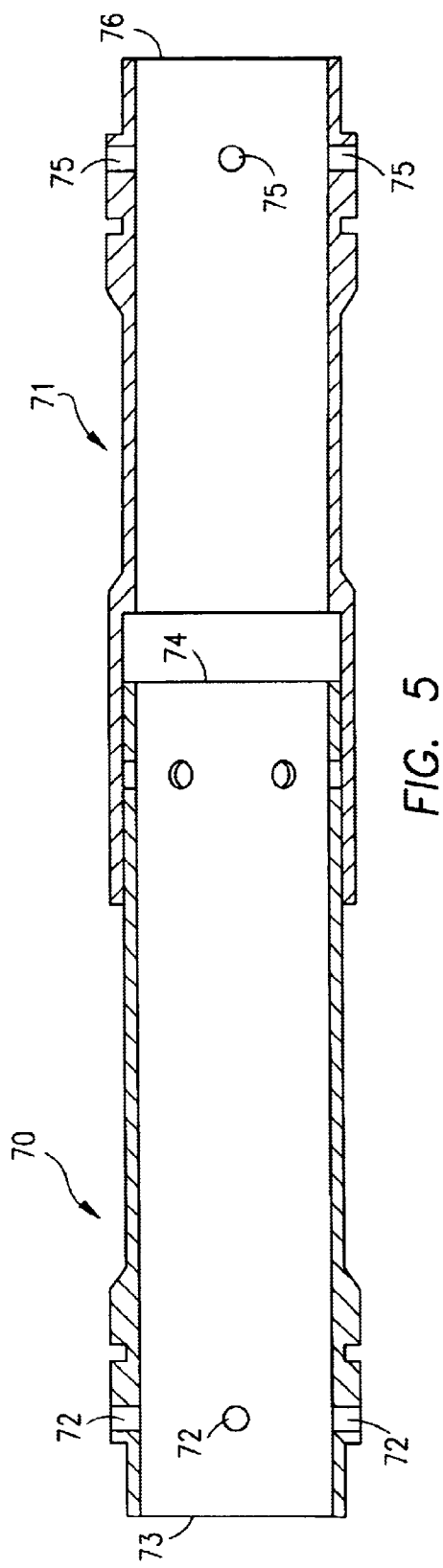
FIG. 5 is a cross section view of inner and outer tubes of a crossfire tube assembly in accordance with an alternate embodiment of the present invention.

A further enhancement to the wear reduction coatings is shown in an alternate embodiment in FIG. 5. While a majority of the crossfire tube features remain identical to the preferred embodiment, and will therefore not be discussed, a further enhancement is made by the addition of a plurality of air purge holes. In the alternate embodiment, inner hollow tube 70 contains a plurality of first air purge holes 72 located proximate first inner end 73 and proximate second inner end 74. Outer hollow tube 71 also contains a plurality of second air purge holes 75 located proximate second outer end 76. Each of the sets of holes serves to introduce a regulated amount of cooling air along the inside walls of the crossfire tubes to provide surface cooling to the relatively soft metal tubes.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A crossfire tube assembly for connecting adjacent combustors in a gas turbine, said crossfire tube assembly comprising:

a hollow inner tube having a first inner end, a second inner end, a first inner wall having a first axis defined therethrough, and a first outer wall coaxial with and radially outward from said first inner wall, said first outer wall having a first diameter proximate said second inner end, and a first groove, having a first groove width, circumferentially disposed about said first outer wall proximate said first inner end;

a hollow outer tube coaxial with said hollow inner tube and having a first outer end, a second outer end, a second inner wall, and a second outer wall coaxial with and radially outward from said second inner wall, said second inner wall having a second diameter proximate said first outer end, and a second groove, having a second groove width, circumferentially disposed about said second outer wall proximate said second outer end;

wherein said first diameter is slightly less than said second diameter such that a portion of said hollow inner tube is telescopically received within said hollow outer tube, said second inner end is located radially inward from said second inner wall;

a first coating applied to said first outer wall of said hollow inner tube and to said second outer wall of said hollow outer tube including said first and second grooves;

a plurality of clips, each of said clips having a first surface, second surface, a thickness there between, a first clip end, a second clip end, a first width at said first clip end, a second width at said second clip end, a first leg and second leg extending from said first clip end to proximate said second clip end, said first leg and said second leg separated by an opening having a third width at said first clip end and a fourth width proximate said second clip end, said first width greater than said second width and said third width greater than said fourth width, a second coating applied to said first surface, said second surface, and across said thickness between said first and second legs, extending from said first end at least along a region of said clip having said first width; and wherein said clips engage said first groove of said hollow inner tube and said second groove of said hollow outer tube by said opening of said clips passing around said first groove and said second groove, respectively.

2. The crossfire tube assembly of claim 1 wherein said first coating is selected from the group consisting of Titanium Aluminum Nitride, Aluminum Titanium Nitride, Titanium Nitride, Stellite 31, Stellite 694, Triballoy T-400, and Triballoy T-800.

3. The crossfire tube assembly of claim 2 wherein said first coating is applied by a physical vapor deposition (PVD) process.

4. The crossfire tube assembly of claim 2 wherein said first coating is applied less than 0.001" thick.

5. The crossfire tube assembly of claim 1 wherein said second coating has an Aluminum Bronze based composition consisting essentially of copper with lesser amounts of aluminum and iron.

6. The crossfire tube assembly of claim 5 wherein said second coating is applied by an air plasma spray process, physical vapor deposition process or high velocity oxygen fuel process.

7. The crossfire tube assembly of claim 5 wherein said second coating is applied between 0.003 inches and 0.006 inches thick.

8. The crossfire tube assembly of claim 1 wherein said thickness of said clip is equal to at least 75% of each of said first groove width and said second groove width of said first and second grooves.

9. A crossfire tube assembly for connecting adjacent combustors in a gas turbine, said crossfire tube assembly comprising:

a hollow inner tube having a first inner end, a second inner end, a first inner wall having a first axis defined therethrough, and a first outer wall coaxial with and radially outward from said first inner wall, said first outer wall having a first diameter proximate said second inner end, and a first groove, having a first groove width, circumferentially disposed about said first outer wall proximate said first inner end, said inner tube having a plurality of first air purge holes proximate said first inner end;

a hollow outer tube coaxial with said hollow inner tube having a first outer end, a second outer end, a second inner wall, and a second outer wall coaxial with and radially outward from said second inner wall, said second inner wall having a second diameter proximate said first outer end, and a second groove, having a second groove width, circumferentially disposed about said second outer wall proximate said second outer end, said outer tube having a plurality of second air purge holes proximate said second outer end;

wherein said first diameter is slightly less than said second diameter such that a portion of said hollow inner tube is telescopically received within said hollow outer tube, said second inner end is located radially inward from said second inner wall;

a first coating applied to said first outer wall of said hollow inner tube and to said second outer wall of said hollow outer tube including said first and second grooves;

a plurality of clips, each of said clips having a first surface, second surface, a thickness there between, a first clip end, a second clip end, a first width at said first clip end, a second width at said second clip end, a first leg and second leg extending from said first clip end to proximate said second clip end, said first leg and said second leg separated by an opening having a third width at said first clip end and a fourth width proximate said second clip end, said first width greater than said second width and said third width greater than said fourth width, a second coating applied to said first surface, said second surface, and across said thickness between said first and second legs, extending from said first end at least along a region of said clip having said first width; and wherein said clips engage said first groove of said hollow inner tube and said second groove of said hollow outer tube by said opening of said clips passing around said first groove and said second groove, respectively.

10. The crossfire tube assembly of claim 9 wherein said first coating is selected from a group consisting of Titanium Aluminum Nitride, Aluminum Titanium Nitride, Titanium Nitride, Stellite 31, Stellite 694, Triballoy T-400, and Triballoy T-800.

11. The crossfire tube assembly of claim 10 wherein said first coating is applied by a physical vapor deposition (PVD) process.

12. The crossfire tube assembly of claim 10 wherein said first coating is applied less than 0.001" thick.

13. The crossfire tube assembly of claim 9 wherein said second coating has an Aluminum Bronze based composition consisting essentially of copper with lesser amounts of aluminum and iron.

14. The crossfire tube assembly of claim 13 wherein said second coating is applied by an air plasma spray process.

15. The crossfire tube assembly of claim 13 wherein said second coating is applied between 0.003 inches and 0.006 inches thick.

16. The crossfire tube assembly of claim 9 wherein said thickness of said clip is equal to at least 75% of each of said first groove width and said second groove width of said first and second grooves.

* * * * *